United States Patent
Lin et al.

(10) Patent No.: US 9,775,300 B2
(45) Date of Patent: Oct. 3, 2017

(54) PLANT GROWTH WEIGHT MEASUREMENT INSTRUMENT AND METHOD THEREOF

(71) Applicant: NATIONAL TAIWAN UNIVERSITY, Taipei (TW)

(72) Inventors: Ta-Te Lin, Taipei (TW); Wei-Tai Chen, Taipei (TW)

(73) Assignee: NATIONAL TAIWAN UNIVERSITY, Taipei (TW)

(*) Notice: Subject to any disclaimer, the term of this patent is extended or adjusted under 35 U.S.C. 154(b) by 248 days.

(21) Appl. No.: 14/169,131

(22) Filed: Jan. 30, 2014

(65) Prior Publication Data

US 2015/0052810 A1    Feb. 26, 2015

(30) Foreign Application Priority Data

Aug. 16, 2013   (TW) .............................. 102129583 A

(51) Int. Cl.
*A01G 7/00* (2006.01)

(52) U.S. Cl.
CPC ...................... *A01G 7/00* (2013.01)

(58) Field of Classification Search
None
See application file for complete search history.

(56) References Cited

U.S. PATENT DOCUMENTS

| | | | | |
|---|---|---|---|---|
| 2,198,309 A * | 4/1940 | James | .................... | F16K 21/16 177/117 |
| 2,828,935 A * | 4/1958 | Ziegler | .................. | A61C 19/00 177/117 |
| 3,168,797 A * | 2/1965 | Patassy | ................. | A01G 27/003 177/207 |
| 3,293,799 A * | 12/1966 | Keller | .................. | A01G 27/003 47/48.5 |
| 4,420,054 A * | 12/1983 | Caris | ...................... | G01G 21/28 177/154 |
| 4,526,246 A * | 7/1985 | Patoray | .................. | G01G 21/28 177/179 |
| 4,785,896 A * | 11/1988 | Jacobson | ............. | G01G 3/1402 177/211 |
| 4,934,096 A * | 6/1990 | Bentvelsen | .......... | A01G 27/003 47/62 N |
| 5,020,261 A * | 6/1991 | Lishman | .............. | A01G 27/003 47/39 |

(Continued)

FOREIGN PATENT DOCUMENTS

| | | |
|---|---|---|
| CN | 102937557 A | 2/2013 |
| KR | 101404518 B1 * | 6/2014 |
| TW | 465274 | 11/2001 |

*Primary Examiner* — Marc Burgess
*Assistant Examiner* — Morgan T Barlow
(74) *Attorney, Agent, or Firm* — Huffman Law Group, PC

(57) ABSTRACT

The weight measurement instrument includes a support frame, a plant holder, and a load cell. The plant holder is assembled with the support frame and has an upper opening and a lower opening, a hydroponic plant can be planted in the plant holder and grow towards the upper opening and the lower opening; the load cell is fixed with the support frame and is used for measuring the total weight of the hydroponic plant automatically. A method for measuring the total weight of the hydroponic plant automatically is also provided.

7 Claims, 2 Drawing Sheets

(56) References Cited

U.S. PATENT DOCUMENTS

| | | | | |
|---|---|---|---|---|
| 5,173,977 | A * | 12/1992 | Carruth | A61G 7/05746 177/144 |
| 5,209,109 | A * | 5/1993 | Chamoulaud | A01G 25/167 47/79 |
| 5,511,341 | A * | 4/1996 | Payne | A01G 27/003 239/302 |
| 6,134,833 | A * | 10/2000 | Bachman | A01G 27/02 47/79 |
| 6,295,865 | B1 * | 10/2001 | Cherry | A01G 27/008 73/73 |
| 6,725,598 | B2 * | 4/2004 | Yoneda | A01G 9/26 47/60 |
| 6,812,413 | B1 * | 11/2004 | Kats | G01G 3/13 177/210 FP |
| 7,337,580 | B2 * | 3/2008 | Han | A01G 9/02 47/71 |
| 7,971,390 | B2 * | 7/2011 | McKenna | A01G 27/003 47/59 R |
| 8,584,397 | B1 * | 11/2013 | Marsh | A01G 27/003 47/48.5 |
| 2006/0112632 | A1 * | 6/2006 | Mori | A01G 27/02 47/65.8 |
| 2007/0220808 | A1 * | 9/2007 | Kaprielian | A01G 27/003 47/48.5 |
| 2008/0097653 | A1 * | 4/2008 | Kaprielian | A01C 23/042 700/284 |
| 2009/0056221 | A1 * | 3/2009 | Ramsey | A01G 31/001 47/59 R |
| 2012/0260569 | A1 * | 10/2012 | Golgotiu | A01G 7/00 47/65 |

* cited by examiner

PLANT GROWTH WEIGHT MEASUREMENT INSTRUMENT AND METHOD THEREOF

CROSS-REFERENCE TO RELATED APPLICATION(S)

This application claims priority of TW invention application no. 102129583 filed on Aug. 16, 2013.

BACKGROUND OF THE INVENTION

1. Field of the Invention

The present invention relates to a weight measurement instrument and method thereof, especially for an automatic hydroponic plant growth weight measurement instrument and method thereof.

2. Description of the Related Art

A hydroponic plant is one kind of exquisite agriculture developed actively by our government. The hydroponic plant is fixed in a holder filled with nutrient solutions and planted with its roots immersed in the nutrient solutions. Comparing the hydroponic method with a traditional method, the hydroponics method can avoid using large amounts of soils, so that blights caused by microorganisms and bugs can be decreased.

Because the hydroponic plant mostly is planted in an indoor room, the hydroponic plant's growth environment can be controlled more easily. In generally, the hydroponic plant at different growth stage needs different environments, and the hydroponic plant's weight is always an important target for evaluating growth conditions, so the hydroponic plant's weight is important information for controlling growth environments. By measuring the hydroponic plant's weight, people can adequately understand environment factors affecting the hydroponic plant's growth.

In the past, people usually took a plant directly, and then puts the plant on an electronic scale to measure its weights. However, we could not measure the plant's weight at each growth stage, and it took much time to take the plant directly. Moreover, the plant was destructed easily when people took the plant directly, so that the measurements of the plant's weight were not accurate.

Therefore, there is a need to develop a non-destructed method and an automatic hydroponic plant growth weight measurement instrument that can solve foregoing drawbacks.

SUMMARY

The main purpose of the present invention is to provide an automatic hydroponic plant growth weight measurement instrument and method thereof. Via the weight measurement instrument, a hydroponic plant's weight at each growth stage can be measured and recorded automatically so that a people do not need to take off the hydroponic plant to measure its weight and economizes effort and time. Moreover, the people can avoid destructing the plant and the measurement of the plant's weight can be more accurate.

According to one embodiment of the present invention, an automatic hydroponic plant growth weight measurement instrument is provided. The weight measurement instrument comprises a support frame, a plant holder, and a load cell. The plant holder is assembled with the support frame and has an upper opening and a lower opening, a hydroponic plant can be planted in the plant holder and grow towards the upper opening and the lower opening; the load cell is fixed with the support frame and is used for measuring the total weight of the hydroponic plant automatically.

According to one embodiment, a method for measuring a hydroponic plant's growth weight is provided. The steps of the method comprise: planting a hydroponic plant in a plant holder assembled with a support frame; measuring the total weight of the hydroponic plant automatically via a load cell mounted on the support frame.

DETAILED DESCRIPTION OF THE EMBODIMENTS

Figure 1:
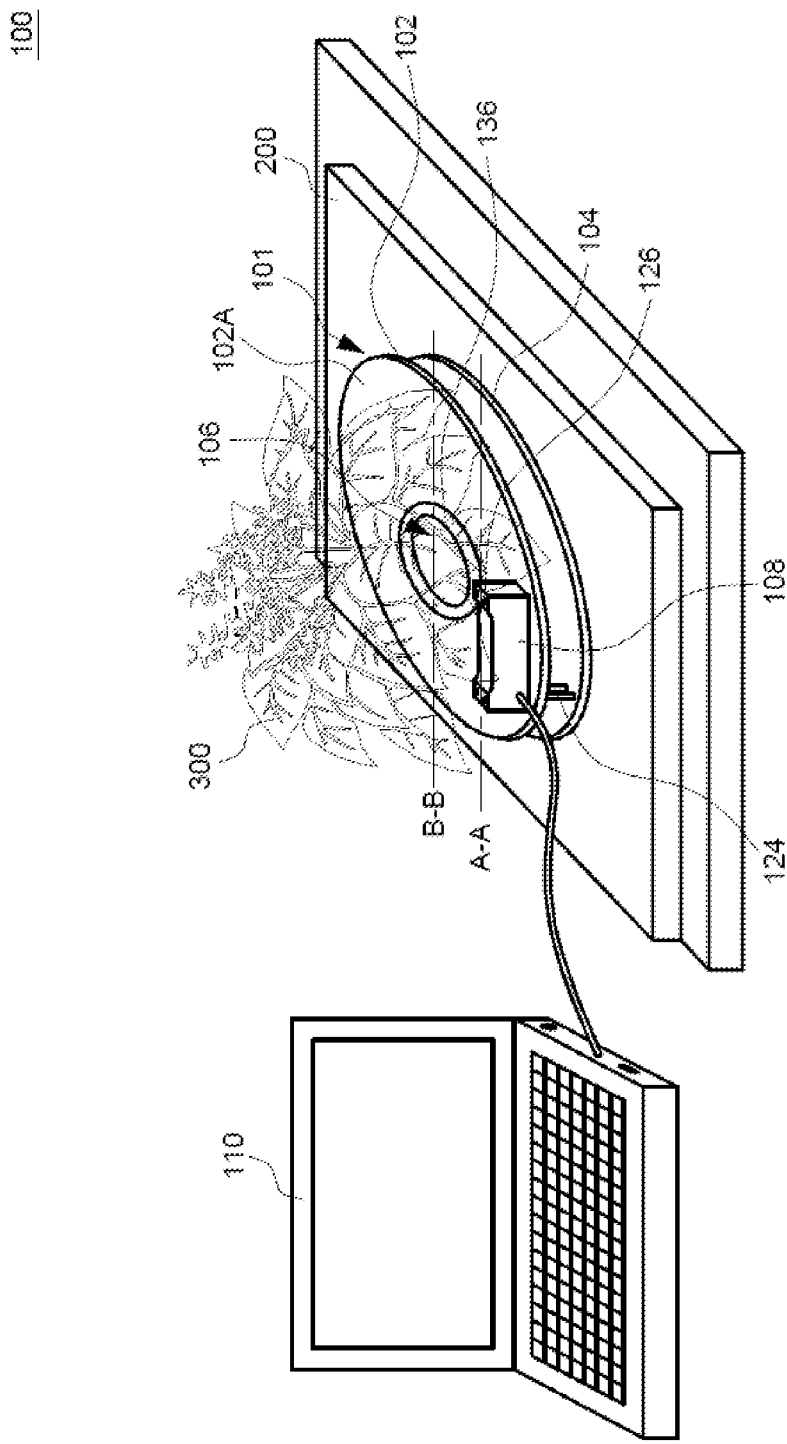
FIG. 1 is a schematic view illustrating one embodiment of a hydroponic plant growth measurement instrument.

FIG. 1 is a schematic view illustrating one embodiment of a hydroponic plant growth measurement instrument. As shown in FIG. 1, the measurement instrument 100 is mounted on a platform 200, and the platform is filled with nutrient solutions. The measurement instrument 100 comprises a support frame 101, a plant holder 106, a load cell 108, and a user interface 110. The support frame 101 includes a circular top disk 102 and a circular bottom disk 104, the plant holder 106 is assembled between the top disk 102 and the bottom disk 104, and a hydroponic plant 300 can be planted in the plant holder 106 and grows from the plant holder 106. The shapes of the top disk 102, the bottom disk 104, and the plant holder 106 can change with the shape of the hydroponic plant 300. The load cell 108 is mounted on an upper surface 102A of the top disk 102, and the load cell 108 is electrically coupled with the user interface 110. In this embodiment, the user interface 110 can be a computer instrument.

Figure 2:
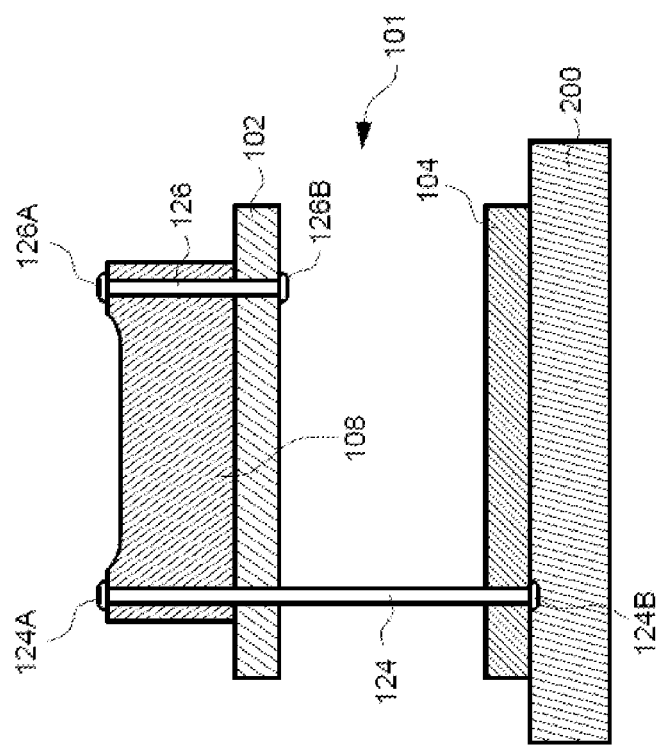
FIG. 2 is a cross-sectional view along A-A line of FIG. 1.

FIG. 2 is a cross-sectional view along A-A line of FIG. 1. Referring to FIG. 1 and FIG. 2, the measurement instrument 100 further comprises a support device 124. In this embodiment, the support device 124 can be a screw. The support device 124 is passed through the top disk 102 and has an upper portion 124A and a lower portion 124B. The upper portion 124A and the lower portion 124B are respectively fixed with the load cell 108 and the bottom disk 104, so that the top disk 102 and the bottom disk 104 are parallel and spaced apart each other. The measurement instrument 100 further comprises a fixing device 126. In this embodiment, The fixing device 126 can be a screw and has an upper portion 126A and a lower portion 126B. The upper portion 126A and the lower portion 126B are respectively fixed with the load cell 108 and the top disk 102.

Figure 3:
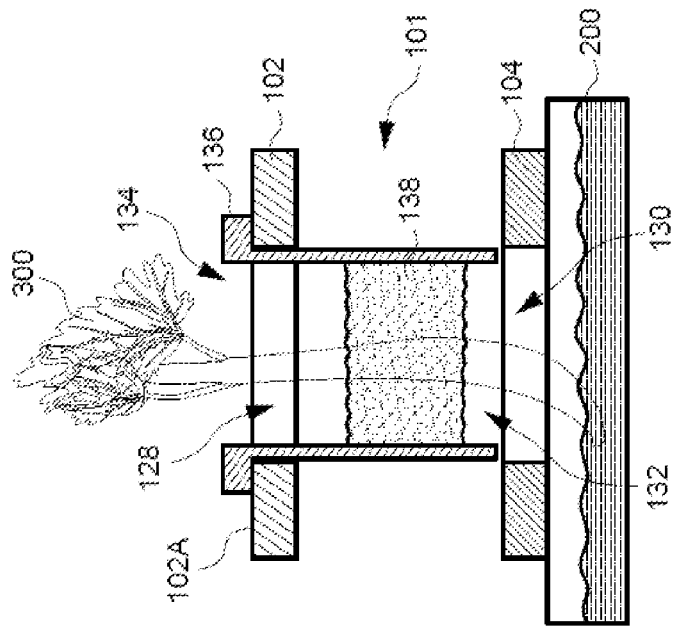
FIG. 3 is a cross-sectional view along B-B line of FIG. 1.

FIG. 3 is a cross-sectional view along B-B line of FIG. 1. Referring to FIG. 1, the top disk 102 and the bottom disk 104 respectively have a first opening 128 and a second opening 130, and the plant holder 106 has a lower opening 132 and an upper opening 134. An edge 136 is protruded from an outer surface of the plant holder 106, the plant holder 106 extends through the top disk 102 and the edge 136 of the plant holder 106 abuts against the upper surface 102A of the top disk 102, so that the plant holder 116 is securely held between the top disk 102 and the bottom disk 104. The first opening 128 is communicated with the upper opening 134, and the lower opening 132 is above the second opening 130. A sponge 138 can be mounted in an interior of the plant holder 106, and the sponge 138 encases the stem of the hydroponic plant 300 to facilitate supporting the hydroponic plant 300.

Referring to FIG. 1 and FIG. 3, a method for measuring the total weight of the hydroponic plant automatically via the measurement instrument 100 is provided. The roots of the hydroponic plant 300 can grow downward to pass through the lower opening 132 of the plant holder 106 and the second opening 130 of the bottom disk 104 in sequence, so that the roots of the hydroponic plant 300 are immersed in the nutrient solutions of the platform 200. The hydroponic plant 300 can grow upward to pass through the first opening 128 of the top disk 102 and the upper opening 134 of the plant holder 106 in sequence. When the leaves of the hydroponic plant 300 fall onto the load cell 108, the load cell 108 can measure the weight of the leaves of the hydroponic plant 300 and transfer the weight information to an electrical signal to transmit to the user interface 110, and then the user interface 110 can store and display the weight of the leaves of the hydroponic plant 300. Therefore, the weights of leaves of the hydroponic plant 300 can be measured and recorded by the load cell 108 and the user interface 110.

The hydroponic plant weight measurement instrument and the method for measuring the total weight of hydroponic plant can provide following advantages at least: The total weight of the hydroponic plant at each growth stage can be automatically and continuously measured and recorded by the load cell and the user interface, so people do not need to take the hydroponic plant directly and knows the change of weight of the hydroponic plant anytime, people not only economizes effort and time, but also the measurement of the weight of the hydroponic plant is accurate because people avoids destructing the hydroponic plant. By measuring the hydroponic plant's weight, people can adequately understand environment factors of affecting the hydroponic plant's growth.

Realizations in accordance with the present invention therefore have been described only in the context of particular embodiments. These embodiments are meant to be illustrative and not limiting. Many variations, modifications, additions, and improvements are possible. Accordingly, plural instances may be provided for components described herein as a single instance. Structures and functionality presented as discrete components in the exemplary configurations may be implemented as a combined structure or component. These and other variations, modifications, additions, and improvements may fall within the scope of the invention as defined in the claims that follow.

What is claimed is:

1. A hydroponic plant growth measurement instrument configured for disposing a hydroponic plant in the hydroponic plant growth measurement instrument, the hydroponic plant growth measurement instrument comprising:
   a support frame, the support frame including a top disk and a bottom disk, the top disk and the bottom disk being spaced apart from each other;
   a plant holder defining an upper opening and a lower opening, wherein the plant holder is assembled so that the upper opening is positioned inside a first opening in the top disk and the lower opening is positioned inside a second opening in the bottom disk, the upper opening and the lower opening defining a passage so that the hydroponic plant is capable of passing through the upper opening of the plant holder;
   a load cell fixed with the top disk; and
   a sponge mounted in an interior of the plant holder and encasing a stem of the hydroponic plant;
   wherein the load cell is arranged to measure a weight of leaves of the hydroponic plant that fall onto the load cell.

2. The measurement instrument according to claim 1, wherein an edge is protruded from an outer surface of the plant holder, the plant holder extends through the top disk and the edge of the plant holder abuts an upper surface of the top disk.

3. The measurement instrument according to claim 1, further comprising one fixing device, wherein the fixing device has a first upper portion and a first lower portion, and the first upper portion and the first lower portion are respectively fixed with the load cell and the top disk.

4. The measurement instrument according to claim 3, wherein the fixing device is a screw.

5. The measurement instrument according to claim 1, further comprising one support device, wherein the support device is passed through the top disk, the support device has a second upper portion and a second lower portion, and the second upper portion and the second lower portion are respectively fixed with the load cell and the bottom disk.

6. The measurement instrument according to claim 5, wherein the support device is a screw.

7. The measurement instrument according to claim 1, further comprising a user interface, wherein the load cell is electrically coupled with the user interface, and the user interface is capable of storing and displaying the weight of the leaves of the hydroponic plant.

\* \* \* \* \*